_United States Patent_ [19]

Moulton

[11] 4,351,396
[45] Sep. 28, 1982

[54] OSCILLATING POWERED CULTIVATING TOOL

[75] Inventor: Lee J. Moulton, Carmichael, Calif.

[73] Assignee: Hawaiian Motor Company, Long Beach, Calif.

[21] Appl. No.: 229,925

[22] Filed: Jan. 30, 1981

[51] Int. Cl.³ ............................................. A01B 35/00
[52] U.S. Cl. ......................................... 172/40; 172/41
[58] Field of Search ...................... 172/40, 41, 42, 43, 172/54.5, 84, 97, 376, 377

[56] References Cited
U.S. PATENT DOCUMENTS

| | | | |
|---|---|---|---|
| 1,827,074 | 10/1931 | Ditlevsen | 172/41 |
| 2,550,522 | 4/1951 | Bolongard | 172/40 |
| 2,779,259 | 1/1957 | Kelsey | 172/41 |
| 2,816,495 | 12/1957 | Brooks | 172/41 |
| 3,548,953 | 12/1970 | Richardson, Sr. | 172/41 |
| 3,710,870 | 1/1973 | Pfeiffer | 172/40 |
| 3,756,324 | 9/1973 | Bills | 172/40 |
| 3,935,905 | 2/1976 | Chery | 172/40 |
| 4,003,436 | 1/1977 | Foster et al. | 172/41 |

FOREIGN PATENT DOCUMENTS 653985  5/1951  United Kingdom ................. 172/42

_Primary Examiner_—Richard T. Stouffer

[57] ABSTRACT

Disclosed herein is a powered cultivating tool or the like which includes a prime mover disposed within a housing, an output shaft extending from said housing having a pinion fixed thereto, said pinion being placed in meshing engagement with a gear having a first roller thereon offset from the axis of rotation of the gear which engages a cam follower operatively connected to a cultivating implement such as a tine so that the implement displays an oscillatory pendulum-like motion about a vertical radial line extending from an axis rotation of the gear. It is contemplated that the gear has extending therefrom an axle whose opposed extremity from the gear is provided with a disc hub having a similar roller, cam follower and the like for accommodating either a terminal portion of the first cultivating implement, or a second cultivating implement so that the sychronization of the two cam followers can be beneficially altered as is required by gardening constraints and the like.

7 Claims, 3 Drawing Figures

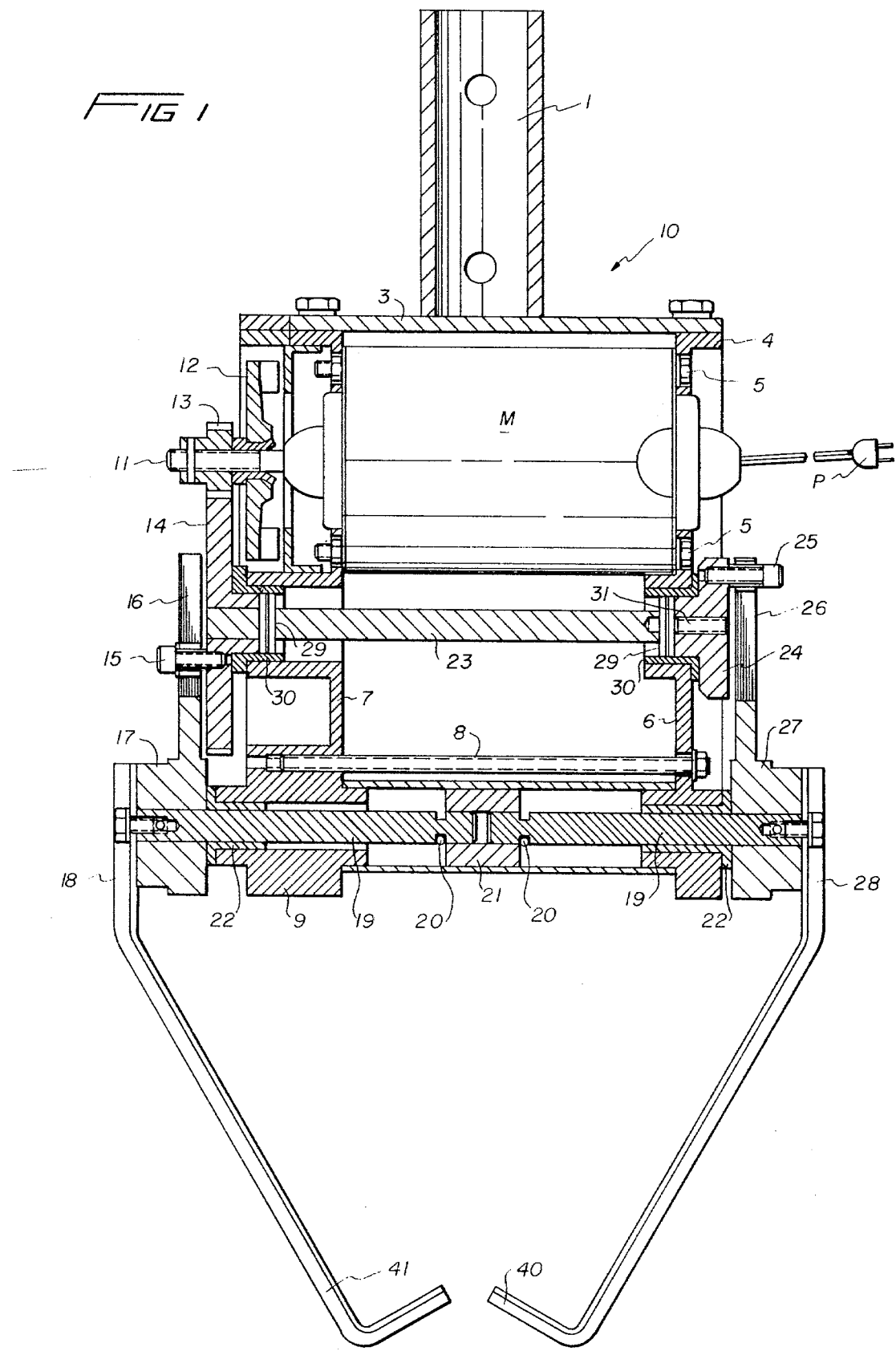

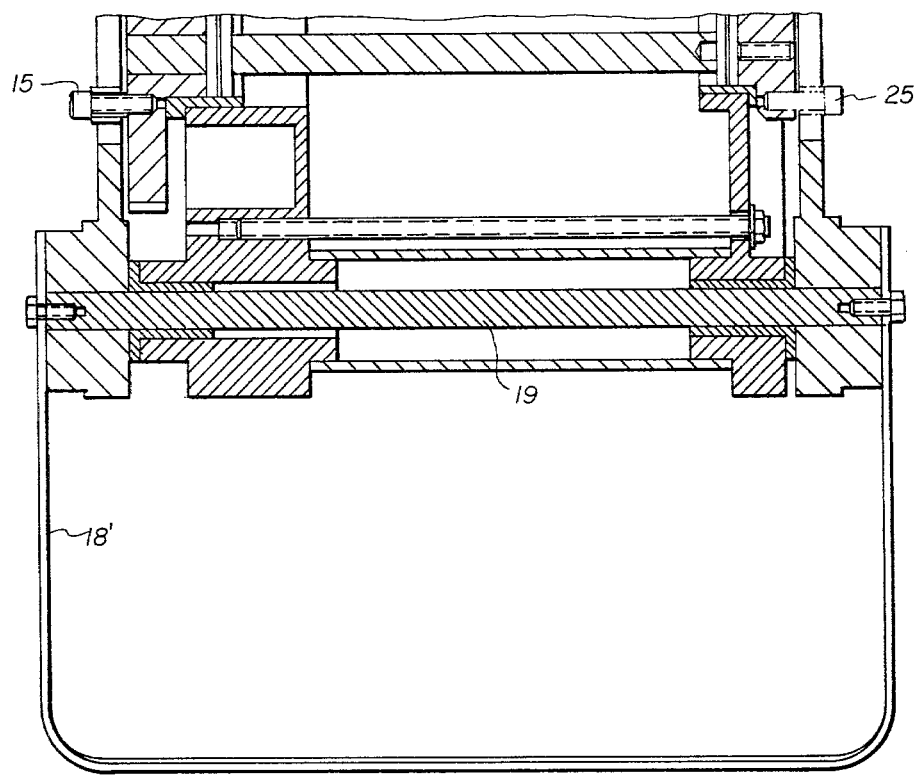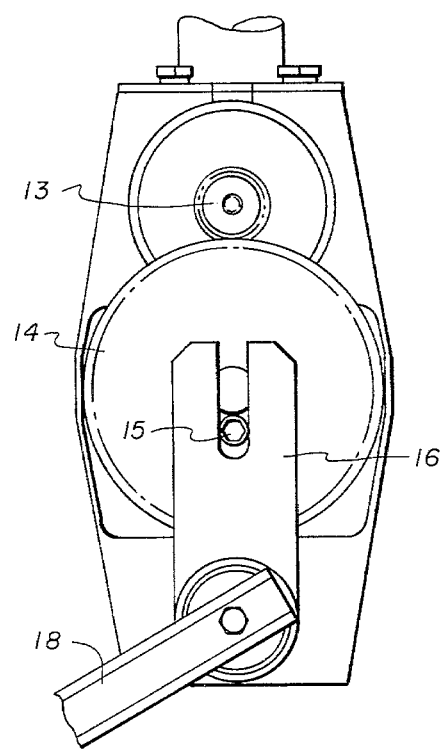

OSCILLATING POWERED CULTIVATING TOOL

BACKGROUND OF THE INVENTION

Since time immemorial man has been obsessed with obtaining greater yields of produce from his agricultural endeavors. It is well known that a tilled garden encourages more vigorous growth of the produce due to elimination of unwanted competition as in the form of weeds.

Accordingly, the following U.S. Pat. Nos. appear to reflect the state of art of which applicant is aware insofar as they are germane to the patent process: 1,827,074 Ditlevsen Oct. 13, 1931, 2,550,552 Bolongard Apr. 24, 1951, 2,779,259 Kelsey Jan. 29, 1957, 2,816,495 Brooks Dec. 17, 1957, 3,548,953 Ricardson Dec. 22, 1970, 3,756,324 Bills Sept. 4, 1973, 4,003,436 Foster Jan. 18, 1977.

Of these, Bolongard teaches the use of a reciprocatory hoe in which a handle has disposed thereon a wheel supported from the handle by means of a bifurcated frame upon which frame rests a motor adapted to drive both the wheel and a hoe. The hoe is chain driven indirectly through an eccentric cam so as to provide reciprocatory motion about an axis which is coincident with the handle.

The patent to Ditlevsen teaches the use of a pick-type power operated hoe having an external power source and a fixed pivot point about which the hoe operates.

The patent to Ricardson teaches the use of a shrubbery and plant digger in which a telescopic sleeve reciprocates and by applying pressure from the handle portion, the implement presumably will go under the ground.

Of these three patents, the first discussed patent requires the use of a wheeled motorized support in order to make the device effective, since as shown in the second and third discussed patents it is not clear from the mechanical actions involved in these patents whether or not the person holding on to the implement would be receiving the cyclic power pulses, or whether they could be adequately distributed and discharged into the soil. That is, if the soil were unusually hard it would appear as though the persons holding on to the handles of these implements would receive the power pulses contrary to the objects of the devices.

The remaining references appear to diverge even further from the structure and claims according to the instant application and those similarities between any of these patents and that which is taught in the instant application appears to be merely coincidental.

OBJECTS AND SUMMARY OF THE INVENTION

Accordingly, it is an object of this invention to provide a device which cultivates ground safely, efficiently, and with greater ease than that which the prior art would suggest.

It is yet a further object of this invention to provide a device of the character described above which is relatively inexpensive to manufacture, extremely durable in construction, and readily manueverable.

It is still a further object of this invention to provide a device of the character described above which can be readily modified as to its various forms or configurations of cutting implements and the actions of the various cultivating implements modified so as to provide a high degree of flexibility in use for plural gardening chores.

It is yet a further object of this invention to provide a device of the character described above which is adapted to be used on all types of terrain, and nimble enough to work in close proximity to plants, while still being capable of cultivating an expanse of area beyond the ken of current machinery.

These and other objects are provided by the invention according to the instant application which teaches the use of a housing within which is provided a prime mover having an output shaft, linkage means operatively connected to the output shaft which includes at least a first eccentric cam, and a cutting implement operatively connected to said eccentric cam so that the implement displays an oscillatory pendulum-like motion about a vertical radial line extending from an axis of rotation of the eccentric cam.

Moreover, these and other objects will be made manifest when considering the following detailed specification when taken in conjunction with the appended drawing figures.

BRIEF DESCRIPTION OF THE DRAWINGS

FIG. 1 is a sectional view of the apparatus in one form according to the present invention.

FIG. 2 is a view of the bottom portion of FIG. 1 showing a second form of the cultivating implement.

FIG. 3 is an end view of the cultivating implement according to the present invention.

BRIEF DESCRIPTION OF THE PREFERRED EMBODIMENT

Referring to the drawings now, wherein like reference numerals refer to like parts throughout the various drawing figures, reference numeral 10 is directed to the powered cultivating tool according to the present invention. The powered cultivating tool 10 includes a prime mover M which as depicted in the drawings is suggestive of an electrical motor, wherein a power cord and plug P extend outwardly from a housing, but it should be appreciated that other forms of prime movers such as gasoline engines and the like are contemplated as being within the scope of this patent.

At any rate, the prime mover M has an output shaft 11 extending without the housing upon which is affixed as by a cotter pin a pinion 13. The pinion 13 communicates in meshing engagment with a gear 14 rotatably disposed on an axle 23, wherein the axle is affixed to the gear 14 by means of pins 29. Bearings 30 suitably support the axle/gear in a manner well known in the art.

An outer face of the gear 14 has disposed thereon a first roller 15 offset from the geometrical center of the gear so as to provide an eccentric cam effect. Straddling the roller 15, a first cam follower 16 is provided having an upwardly extending bifurcated portion which straddles the first roller to transmit the cam's motion. The lower portion of the cam follower 17 is affixed to a spindle 19 which will be explained hereinafter, but as shown in FIG. 1, 15 substantially frictionless supported by means of the bushings 22 and 21.

Affixed to the lower portion of the cam follower 17 is a first tine 18 which curves inwardly as at 41 and then upwardly as shown upwardly by reference numeral 40, FIG. 1.

In view of the foregoing, it should be apparent that when the motor is energized, the implement 18 will display an oscillatory pendulum-like motion about a vertical radial line extending from an axis of rotation of the gear 16.

The axle 23 has an extremity remote from the gear 16 which has affixed thereto a hubbed disc 24 similarly affixed to the axle by means of pins 29 and supported by bushings 30. The hubbed disc 24 is further affixed to the axle 23 by means of screw 31, and a peripheral portion of the disc 24 has a second roller 25 offset from the axis similar to the first roller 15, and this roller similarly drives a cam follower having a bifurcated upper portion 26 which straddles the second roller, and a lower portion 27 supported on a spindle 19 as through bearings 22.

As shown in FIG. 1, two spindles 19 are provided each of which share a common bushing block 21, and the spindles are retarded from axial translation by means of locks 20 constrained within the grooves on the spindles proximate to their common bushing so that the danger of a tine becoming dislodged is effectively prohibited not only by the construction of the spindle but also an outer bulbous portion of the rollers 15 and 25 as shown in the drawings. In one form of the invention the first and second rollers 15 and 25 are adapted to work 180° out of phase so that the motion of one of the tines 28 opposes the motion of the other tine 18 and a balanced opposing working force is provided contrary to the prior art. Such an arrangement would have obvious utility in working rather hard soil which has not been cultivated recently. In a second form of the invention a single tine 18' has two upper portions and is substantially in the form of a U, wherein each of the upper portions affixes to its respective cam follower, and the cam followers connection to the first and second rollers is such that they are not 180° out of phase but they travel together so that the motion of the followers is not opposed but in unison. This type of arrangement would perhaps be best suited for working in soils that are already light and aeriated and in which a gentle scrubbing of the topmost soil is desired. A single spindle 19 is required, roller 25 is optional, and therfore cam follower upper portion 26 is superfluous.

FIG. 3 shows an end view of the apparatus according to the present invention in which it is clear that the spindle 19, axle 23, and output shaft 11 are all symmetrically disposed and vertically aligned so that the machine is not only self-balanced but the majority of the weight associated with the machine is directed as a vertical component absorbed by its reaction to the soil, and does not have to be borne by the person operating the implement, as has frequently occurred in the prior art.

As shown in FIGS. 1 and 3, the housing includes and supports a handle 1 of any suitable configuration, a top plate 3 which conceals the motor M and is affixed to the housing through bolts that extend into elemental area 4 of the housing, and the motor M is bolted within the housing as through 5. In this particular instance, a cooling fan 12 is provided for the electrical motor.

A lower portion of the housing has spaced walls 6 and 7 interconnected by means of a threaded bolt 8 which is placed just above the spindle(s) as shown in the drawings and the spindle 19 has protection from the environment by means of a bottom shroud 9.

Having thus described the invention therefore, it should be apparent that numerous structural modifications are contemplated as being a part of this invention as described hereinabove and as defined hereinbelow by the claims.

What is claimed is:

1. A powered cultivating tool or the like comprising, in combination:

a housing having a top portion including a handle supported thereon, said housing defining an enclosure within a topmost portion of which a prime mover is disposed, ventilation means for said prime mover, an output shaft extending from said prime mover without said housing, a pinion fixed to said output shaft and an axle having opposite extremities with a gear carried on one of said extremities, said gear being adapted to mesh with said pinion, said axle supported on bearings within said housing and being vertically below and parallel to said prime mover's output shaft and having both said extremities extending without said housing, a roller on said gear, axially offset from said axle defining a first cam, a spindle means vertically below and parallel to said axle disposed in said housing supported on bearings and having terminal portions extending outwardly from said housing, a first cam follower fixed on said spindle means having an upwardly open U-shaped bifurcated portion straddling said roller, and a cultivating tine fixed to said cam follower and said spindle for pendulum like oscillation in response to movement said roller through said prime mover.

2. The device of claim 1 wherein said axle's other extremity is connected to a hubbed disc provided with a second roller thereon which is offset from a center line of said axle thereby providing a second eccentric cam, and a second cam follower straddling said second roller.

3. The device of claim 2 wherein said first and second cam followers move about a common axis and includes said spindle means affixed to a respective one of said cam followers at opposed extremeties of said spindle means, said spindle means constrained from axial displacement.

4. The device of claim 3 wherein said spindle means are constrained from axial translation by grooves on said spindle means and lock rings in said grooves adapted to abut against bushings.

5. The device of claim 4 wherein said tine has a first and a second upper portion, each said portion connected to said spindle means, said first and second rollers aligned to travel together, said spindle means formed as one piece.

6. The device of claim 4 including a second tine fastened to said second follower, said first and second rollers are aligned 180° out of phase, said spindle means formed as two pieces.

7. The device of claim 5 or 6 wherein said housing is formed from spaced walls interconnected by a threaded bolt, a bottom shroud communicating with said spaced walls and protecting the interior of said housing and a removable top plate connected to said side walls, said top plate supporting said handle and providing access to the interior of said housing.

* * * * *